United States Patent
Born et al.

[15] 3,701,535
[45] Oct. 31, 1972

[54] CONTACT-FREE HYDROSTATIC SEAL

[72] Inventors: Dieter Born, Hessheim; Peter Stech; Werner Huebner, both of Roxheim, all of Germany

[73] Assignee: Klein, Schanglin & Becker A.G., Frankenthal-Pfalz, Germany

[22] Filed: April 27, 1970

[21] Appl. No.: 32,210

Related U.S. Application Data

[62] Division of Ser. No. 702,001, Jan. 31, 1968.

[30] Foreign Application Priority Data

July 27, 1967 Germany...................K 62907
Aug. 11, 1967 Germany...................K 63081

[52] U.S. Cl. ..........................277/3, 277/27, 277/28, 277/73
[51] Int. Cl. ..........................F16j 15/40, F16j 15/44
[58] Field of Search......................277/3, 27, 28, 73

[56] References Cited

UNITED STATES PATENTS

| | | | |
|---|---|---|---|
| 2,895,750 | 7/1959 | Gardner et al.................. | 277/3 |
| 3,085,808 | 4/1963 | Williams.................. | 277/3 X |
| 3,273,899 | 9/1966 | Warnery.................. | 277/73 X |

Primary Examiner—Samuel D. Rothberg
Attorney—Michael S. Striker

[57] ABSTRACT

A contact-free hydrostatic seal wherein a rotary first annular sealing element defines with a second annular sealing element a gap for leak fluid. The second sealing element is biased toward the first sealing element by closing springs which tend to reduce the width of the gap. A pump delivers fluid into the gap to oppose the action of closing springs and to prevent direct contact between the sealing elements. When the pressure of fluid drops to such an extent that it can be overcome by the bias of closing springs, a safety device becomes operative to oppose such bias and to hold the second sealing element away from the first sealing element. The safety device includes a lever which is pivoted into engagement with the second sealing element by one or more strong springs when such strong spring or springs overcome the fluid pressure at a time when the fluid pressure is too low to prevent the closing springs from moving the second sealing element into frictional engagement with the first sealing element.

5 Claims, 1 Drawing Figure

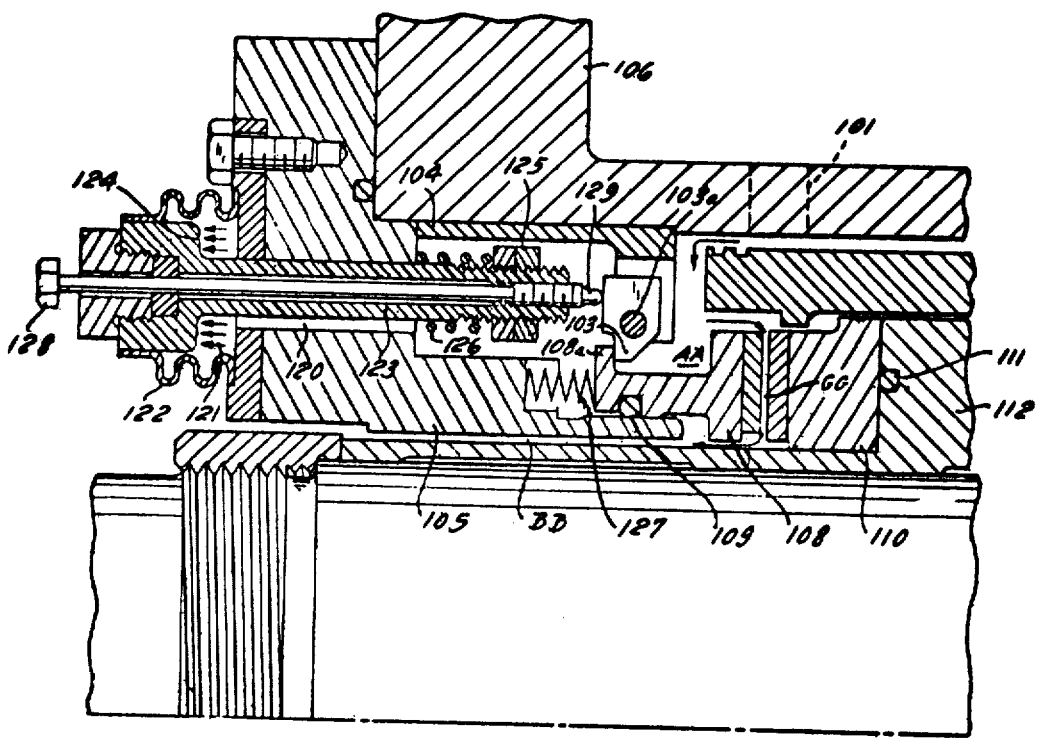

CONTACT-FREE HYDROSTATIC SEAL

CROSS-REFERENCES TO RELATED APPLICATIONS

The present application is a divisional application of the application Ser. No. 702,001, filed Jan. 31, 1968.

BACKGROUND OF THE INVENTION

The present invention relates to hydrostatic seals in general, and more particularly to improvements in contact-free hydrostatic seals which can be utilized in pumps for nuclear reactor systems, particular in pumps which convey coolant in boiling water reactor systems. In such reactor systems, the coolant must be circulated at a very high pressure which necessitates the provision of special seals in addition to conventional seals. A characteristic feature of boiling water reactor systems is that the operating pressure varies with changes in steam pressure. Therefore, the elements of the seal are held out of contact only if the opening forces produced by the pressure of fluid exceed the closing forces which latter tend to move the sealing elements into frictional engagement with each other. The closing forces are produced by the pressure of leak fluid and by resilient closing elements. If the difference between the closing pressure and the pressure of leak fluid decreases below a certain value, the seal closes and this brings about rapid destruction of sealing elements. These sealing elements normally include a rotary annular sealing element which rotates with the pump shaft and an axially movable sealing element which is held against rotation and defines with the rotary element a gap for leak fluid.

SUMMARY OF THE INVENTION

An object of our invention is to provide a hydrostatic seal wherein a first sealing element rotates with reference to a second sealing element and to provide such seal with a safety device which prevents frictional engagement between the sealing elements under all operating conditions.

Another object of the invention is to provide a hydrostatic seal wherein the opening force of fluid is automatically assisted when the fluid pressure drops to a value at which the gap between the sealing elements is likely to close due to the action of closing forces.

A further object of the invention is to provide a hydrostatic seal whose useful life exceeds considerably the useful life of presently known contact-free hydrostatic seals.

An additional object of the invention is to provide a hydrostatic seal wherein the fluid pressure at which a constant closing forces tends to close the gap between the sealing elements can be selected and varied at will and wherein such selection or adjustment can be effected when the seal is in actual use.

Still another object of the invention is to provide a hydrostatic seal whose operation is automatic and wherein changes in fluid pressure can trigger operation of the safety device to prevent closing of the gap between the sealing elements.

A concomitant object of the invention is to provide a hydrostatic seal which occupies little room and comprises a small number of simple parts.

The improved hydrostatic seal comprises a rotary first sealing element, a second sealing element coaxial with and defining with the first element an annular gap for leak fluid, biasing means including one or more closing springs or the like for urging one of the sealing elements toward the other sealing element to reduce the width of the gap, a feed for conveying into the gap water or another fluid at a pressure which normally suffices to oppose the biasing means and to maintain the sealing elements out of contact with each other, and safety means for opposing the biasing means in response to a predetermined drop in fluid pressure so as to maintain the sealing elements out of contact when the pressure of fluid supplied by the feed is insufficient to prevent excessive reduction in the width of the gap.

The novel features which are considered as characteristic of the invention are set forth in particular in the appended claims. The improved hydrostatic seal itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The drawing is an axial sectional view of a hydrostatic seal according to the present invention.

DESCRIPTION OF THE PREFERRED EMBODIMENTS

The drawing illustrates a hydrostatic seal wherein a shaft 113 rotates with a protective sleeve 112 and the latter carries a rotary first sealing element 110. A second sealing element 108 defines with sealing element 110 an annular gap GG. The housing 106 has a single channel 101 which receives fluid from a feed pump (not shown). Such fluid enters a space AA and passes through the gap GG to enter a space BB. The space AA further admits pressurized fluid into a passage 120 which communicates with a chamber 121 surrounded by a flexible bellows 122. The numerals 109, 111 respectively denote sealing rings for the sealing elements 108, 110. The carrier 105 for the axially movable sealing element 108 defines the aforementioned passage 120 and supports the bellows 122. The sealing element 108 has an annular flange 108a which can be engaged by a rockable shifting member 103 here shown as a two-armed lever which is fulcrumed at 103a and is supported by a holder 104. The means for rocking the lever 103 in a clockwise direction so that the lower arm of the lever bears against the flange 108a and moves the sealing element 108 away from the sealing element 110 comprises a piston 123 having a shoulder 124 located in the chamber 121 and a collar 125 located in the space AA. The piston 123 is movable in parallelism with the axis of the shaft 113 and extends through a bore of the carrier 105. Its left-hand end is sealingly secured to the bellows 122. A helical expansion spring 126 operates between the collar 125 and carrier 105 to bias the piston 123 to the right. The bias of this spring is opposed by fluid pressure in the chamber 121 if such pressure is high enough to overcome the pressure of leak fluid in the space BB plus the bias of one or more closing springs 127 operating between the carrier 105 and sealing element 108.

The piston 123 meshes with an adjustable screw 128 whose tip 129 moves into abutment with the upper arm of the lever 103 when the spring 126 is free to overcome the fluid pressure against the shoulder 124. The purpose of the screw 128 is to prevent excessive widening of the gap GG when the spring 126 is free to move the piston 123 and screw 128 in a direction to the right, as viewed in the drawing. Thus, when the seal operates normally (namely, when the fluid pressure in the space AA suffices to overcome the pressure of leak fluid in space BB plus the bias of springs 126 and 127), the tip 129 of the screw 128 can be spaced from the lever 103, and the distance between the tip 129 and the upper arm of the lever 103 can be selected in such a way that the lever is rocked only when the pressure in chamber AA drops to a predetermined minimum value. Such minimum pressure can be determined by simple calculation or by experimentation.

The screw 128 can be said to constitute an adjustable portion of the piston 123. The bellows 122 can be made of austenitic chromium steel.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore such adaptations should and are intended to be comprehended within the meaning and range of equivalence of the claims.

What is claimed as new and desired to be protected by Letters Patent is set forth in the appended claims:

1. A contact-free hydrostatic seal for controling leakage of fluids between stationary and moving components comprising a rotary first sealing element; a second sealing element coaxial with and defining with said first sealing element a gap; biasing means urging one of said sealing elements axially toward the other sealing element to reduce the width of said gap; a feed for conveying fluid into said gap under pressure which normally suffices to oppose said biasing means and to maintain said sealing elements out of contact with each other; and safety means for opposing said biasing means in response to a predetermined drop in fluid pressure so as to maintain said elements out of contact when the pressure of fluid supplied by said feed is insufficient to prevent excessive reduction in the width of said gap, said safety means comprising a shifting member movable into engagement with said one sealing element to shift the latter away from said other sealing element, piston means movable against said shifting means to move the latter into engagement with said one sealing element, and resilient means biasing said piston means against said shifting means, said piston means being subjected to the pressure of fluid supplied by said feed and such fluid opposing the bias of said resilient means when its pressure suffices to oppose said biasing means.

2. A hydrostatic seal as defined in claim 1, wherein said shifting member is a lever and said piston comprises an adjustable portion which engages with said lever to pivot the latter against said one sealing element when said resilient means overcomes the fluid pressure.

3. A hydrostatic seal as defined in claim 1, further comprising a housing for said piston means, a bellows affixed to said piston means and said housing and defining therewith a chamber in communication with said feed, said piston means having a shoulder provided in said chamber and acted upon by fluid admitted by said feed to oppose the bias of said resilient means.

4. A hydrostatic seal as defined in claim 1, wherein said biasing means comprises at least one first spring operating between a carrier for said one sealing element and said one sealing element, and said resilient means comprises at least one second spring operating between said carrier and said piston means.

5. A hydrostatic seal as defined in claim 1, wherein said one sealing element is said second sealing element and wherein said first sealing element rotates with reference to said second sealing element.

* * * * *